UNITED STATES PATENT OFFICE.

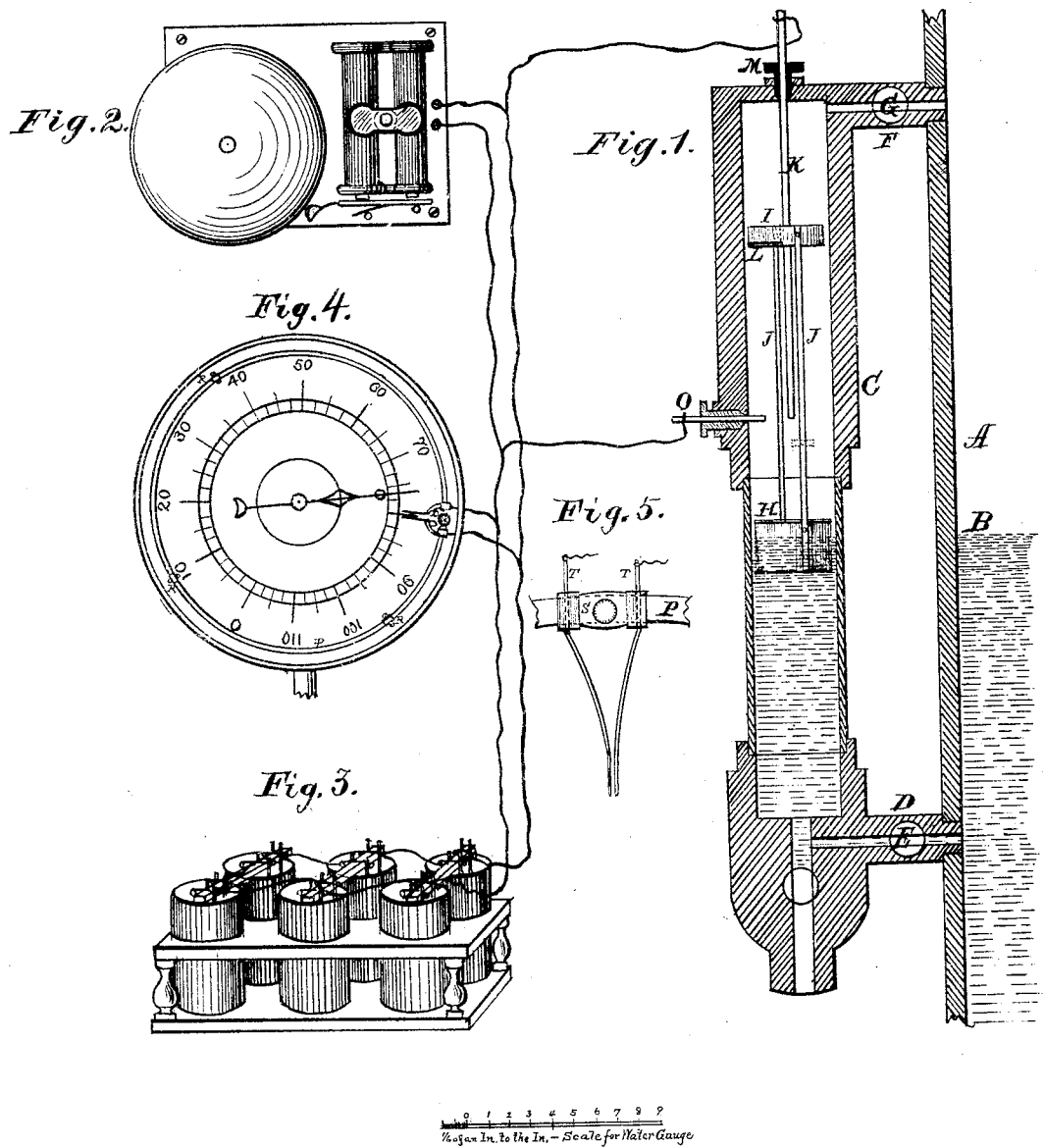

JOHN D. COUGHLIN, OF NEW YORK, N. Y.

IMPROVEMENT IN ELECTRICAL WATER AND PRESSURE INDICATORS FOR STEAM-BOILERS.

Specification forming part of Letters Patent No. 130,281, dated August 6, 1872.

SPECIFICATION.

*To whom it may concern:*

Be it known that I, JOHN D. COUGHLIN, of No. 83 Cedar street, in the city, county, and State of New York, have discovered and invented a new and useful Improvement in "Low-Water and Steam-Pressure Indicators" for Steam-Boilers; and I do hereby declare that the following is a full, clear, and exact description of the same, reference being had to the annexed drawing making a part of this specification, in which—

Figure 1—Letter A represents a section of a steam-boiler, with the water therein at a level with letter B; while letter C represents an ordinary water-gage, (with glass indicating-tube,) connected with the boiler A by means of the pipes or branches D and F with stop-cocks E and G, the pipe or branch D with stop-cock E admitting the water from the boiler to flow in and fill the gage C to a level with the water in the boiler, and the pipe F with stop-cock G admitting the steam from the boiler into the gage C, whereby a pressure of steam and a column of water is established within the gage precisely corresponding to the pressure of steam and the height of water within the boiler, and thus securing a perfect operation of a float within the gage. Thus far I claim no invention or discovery, believing the water-gage described and various forms of floats to have been used heretofore. But within this gage, which may be made of any desired size, having an internal cavity of from half an inch to several inches in diameter, and from one foot to several feet in length, I place a float, letter H, connected with a plate or disk, I, by means of the rods J J; and through a stuffing-box, M, at the upper end of the water-gage C, properly arranged to secure a perfect insulation, I insert an electrical conducting-rod, K, passing it vertically downward through an aperture in the center of the plate or disk I, which disk must be made of some non-conducting material, in order to insure a perfect insulation between the rod K and the rods J J. To the under side of this disk I attach a narrow plate of metal, which I call a "contact-plate," L, extending from the periphery of the disk to and surrounding the hole in the center thereof, through which the rod K passes, taking care that it does not come in contact with the rods J J, but so arranging it that it shall and will form a contact with the rod K, in order to establish an electrical connection between it and the rod K. Just above the lower end of the rod K, in the gage, I insert horizontally a short electrical rod, O, (properly insulated from the metallic parts of the gage C,) so that the contact-plate L, whenever the float H, by reason of the water in the boiler falling below the proper point, shall be brought in contact with the said rod O and establish an electrical connection between the rod O, the contact-plate L, and the rod K, for the purposes hereinafter shown. Fig. 2 represents an alarm-bell or gong, duly provided with proper intensifying-coils, the poles of a battery, a hammer, &c. Fig. 3 represents an electrical battery, fully and properly arranged for use, and connected by the usual and appropriate positive and negative wires, with the rods K and O, and with the alarm bell or gong, Fig. 2, and also with the steam-pressure gage, Fig. 4. Fig. 4 represents an ordinary dial steam-pressure gage, with the hand indicating a pressure of about seventy-seven pounds, and having properly attached to it, by means of set-screws at the figure 80, the two poles of a battery, so arranged and connected with very delicate metallic springs that the simple pressure of the indicating-hand upon one of the springs will bring it in contact with the other spring. Fig. 5 indicates the manner in which the poles of the battery are attached to the steam-pressure gage, letter P representing a section of a brass ring, attached to the periphery of the gage by means of the arms R R R; and letter S represents a sliding holder or clamp, to be fastened at any point on the ring by means of a set-screw, embracing or clasping the two poles of the battery, constructed of thin strips of brass or other metal T, so arranged that the ends thereof shall be in the direct track or circuit of the point of the indicating-hand upon the dial of the gage, and that when the steam rises above the pressure for which the alarm is set the point of the said hand will press one strip of brass or metal upon the other, and thus set the battery in motion and cause the alarm-bell to ring.

Having thus described the mechanism of my invention and the appliances used in connection with it, I need only state the working and the operation of it, as follows:

First, the water-gage, Fig. 1, letter C, must be proportioned in length to the diameter of the boiler to be used; must be attached thereto in such a manner and position that the float, letter H, with the plate or disk I will have ample space wherein to rise and float upon the surface of the water when the boiler is filled to its ordinary line, and also so that when the water falls the float may, without rubbing or friction against the interior of the tube, readily follow the water-line in its downward course until it reaches the line of danger and until the contact-plate L rests upon the rod O. And here it must be observed that the relative positions of the float, the contact-plate, and the rod O must be so precisely arranged that the instant the float, in following down the receding water, reaches the line of danger, the plate L and the rod O will be brought into contact, thus establishing an electrical circuit and communicating the electricity to the bell or gong, and cause an alarm to be sounded until the water is again brought to the line of safety. Second, the steam-pressure gage may be placed at any convenient point in the engine or boiler room, and connected with the alarm bell or gong by positive and negative branch wires from the main wires connecting the battery with the water-gage, as shown in the drawing, with the poles thereof placed in position, as described under the head of Fig. 4, at any figure denoting the limit of pressure to be used, and in such manner that the dial-hand or indicator, when it reaches that figure, shall press upon one of the springs attached to the wire and serving as one of the poles of the battery, and cause it to come in contact with the other pole, whereby an electrical circuit will be established and the electricity communicated to the alarm bell or gong, and cause it to sound in a continuous alarm until the pressure is reduced and the circuit broken.

Thus it will be seen that, without taking from the engineer any of his present guards and safety arrangements, I leave those with him and add to them another, and, as I believe, a far more important one than any now in use. The engineer may test the measure of water in the boiler by turning the water-cocks, and, should the water be foaming, may be deceived. He may cast his eye upon the steam-pressure gage, and all may appear right; yet a few moments later, from some almost and often quite inexplicable reason, an explosion ensues. Whereas, with my improvement he not only has the sense of sight, as before, to guide him, but the instant danger threatens he will be alarmed by an appeal to his sense of hearing.

Having thus described my invention and improvement, which I desire to secure by Letters Patent, I claim—

1. The electrical rods K and O, the plate or disk L, the contact-plate M, and the float H, all as arranged and described, in combination with the gage C, the electrical battery, and the alarm bell or gong, substantially as and for the purposes herein set forth.

2. I claim, in combination with the hand and dial of a pressure-gage, the circuit-closing device, substantially as described.

3. I claim, in combination with one electrical circuit and alarm-bell, the low-water indicator and the pressure-indicator, substantially as set forth.

JNO. D. COUGHLIN.

Witnesses:
SPENCER KIRBY,
JAMES C. MARTIN.